United States Patent [19]

Deyhle et al.

[11] Patent Number: 4,678,514

[45] Date of Patent: Jul. 7, 1987

[54] PROCESS FOR THE DISPOSAL OF COMBUSTIBLE REFUSES

[75] Inventors: Henning Deyhle, Schlangenbad; Alexaner Grisar, Mainz-Finthen, both of Fed. Rep. of Germany

[73] Assignee: Dyckerhoff Engineering GmbH, Wiesbaden, Fed. Rep. of Germany

[21] Appl. No.: 715,437

[22] Filed: Mar. 25, 1985

[30] Foreign Application Priority Data

Mar. 27, 1984 [DE] Fed. Rep. of Germany ....... 3411144
Mar. 27, 1984 [DE] Fed. Rep. of Germany ....... 3411148

[51] Int. Cl.$^4$ .............................................. C04B 7/43
[52] U.S. Cl. ..................................... 106/100; 106/103
[58] Field of Search ................................. 106/100, 103

[56] References Cited

U.S. PATENT DOCUMENTS

| | | | |
|---|---|---|---|
| 4,081,285 | 3/1978 | Pennell | 106/100 |
| 4,123,288 | 10/1978 | Stringer et al. | 106/100 |
| 4,179,263 | 12/1979 | Jung et al. | 106/100 |
| 4,256,503 | 3/1981 | Tsuda et al. | 106/100 |
| 4,533,396 | 8/1985 | Herchenbach et al. | 106/100 |

*Primary Examiner*—William R. Dixon, Jr.
*Assistant Examiner*—Steven Capella
*Attorney, Agent, or Firm*—Sprung, Horn, Kramer & Woods

[57] ABSTRACT

The invention relates to a process for the disposal of combustible refuses in the manufacture of cement clinker by preheating and partly calcining the cement raw meal in a preheater, burning in a rotary kiln and subsequently air cooling the clinker, the refuse being separately burned and the flue gas obtained thereby transfers its heat to the cement raw meal. In the process according to the invention, hot exhaust air of the clinker cooler is fed to the refuse incineration and flue gas having a temperature of from 1000° to 1400° C. is produced during said incineration by means of which the cement raw meal is calcined. The slag of the refuse incineration is separately discharged.

17 Claims, 1 Drawing Figure

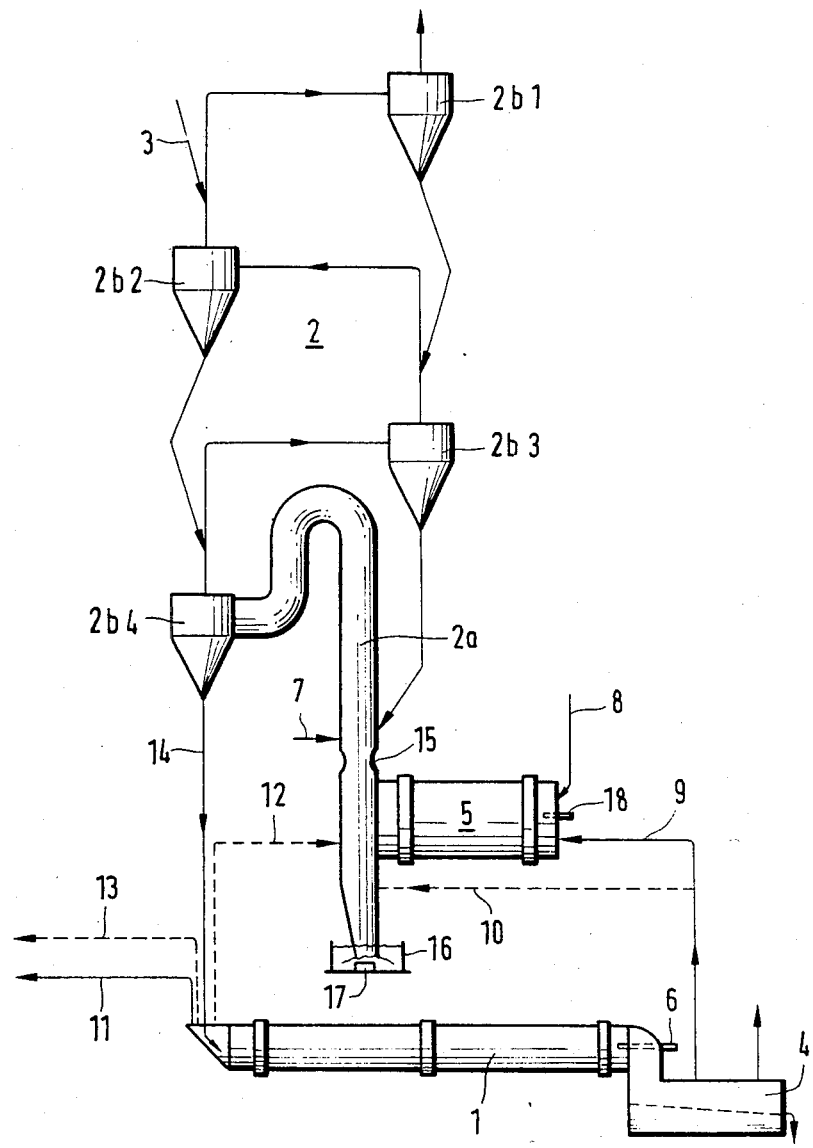

PROCESS FOR THE DISPOSAL OF COMBUSTIBLE REFUSES

The invention relates to a process for the disposal of combustible refuse and for burning cement clinker in a rotary kiln and subsequently air cooling the clinker, the waste being separately burned and the flue gas obtained thereby transfering its heat to the cement raw meal.

The rising problems concerning waste the disposal of materials, namely municipal waste, industrial waste and other refuses, are well known. Even nowadays, the major part of the wastes is dumped in landfills and burdens the environment.

Various methods are used of selective processing waste materials, particularly municipal waste, the composting and/or burning thereby the dump of volume is reduced, however, these processes are expensive and may be harmful to the environment. The prior art methods for incineration may result in the formation of polychlorinated dibenzodioxines and dibenzofurans. A product containing heavy metals is obtained according to the composting methods known in the art.

Many attempts have been made to combine the disposal of combustible refuse with the manufacture of marketable products.

Thus, the disposal of combustible refuse in the manufacture of cement clinker is prior art, as far as minor amounts of refuse are involved.

DE-PS No. 26 24 971 teaches a process for using industrial refuse, containing combustible substances, in burning processes for the manufacture of cement, in which the refuse is brought in contact with the materials being burned in such a manner that the latter absorb the inorganic components of the waste that are produced during the burning or decomposition process. There is a limit to the amount of refuse which can be used as the materials being burned can only tolerate a limited amount of waste ashes due to quality reasons. The production of cement clinker requires a defined chemical composition of the product, which should be maintained within relatively narrow limits. Variation in the chemical composition of the materials being burned are tolerable only to a very limited extent, both in respect of the process and the product quality. In the processing of waste, the chemical composition of the cement raw meal should, therefore, be adapted to the ash content of the combustible waste material. If waste material having an ash content that varies within wide limits is involved, or that has a very different chemical composition from that of the cement raw meal, it will only be possible to use very small amounts of combustible waste material.

The amount of combustible waste that can be used in the prior art process is the smaller, the higher and the more non-uniform the ash content; the more the chemical composition of this ash varies, the more the composition of the clinker deviates from the desired composition and the less pure correcting materials are available to counteract the undesired influence. In so far, the range of usable waste is in practice between about 0.05 to about 0.10 kg/kg cement clinker.

Attempts were also made to use larger amounts of waste material.

According to one prior art method, garbage is divided into several fractions and merely the low ash and high calorific value fraction is used as fuel for burning cement clinker. Thus, larger amounts of refuse can be used in such processes as compared to processes using refuse which has not been treated because of the lower ash content of the treated refuse. However, the ash content of the separated refuse fraction is still too high as to allow using large amounts of it for the manufacture of clinker. Furthermore, the separation process is expensive and results in considerable amounts of high ash components that must be disposed of in another manner.

DE-OS No. 27 48 510 also teaches a process for using waste materials containing combustible components in the manufacture of cement, comprising gasification of the waste material and utilizing the so-obtained pyrolysis gases in the cement clinker kiln as fuel. However, the residual fraction obtained during pyrolysis still contains combustible components and, accordingly, the heat-economical exploitation is only partial. Great technical problems have been encountered in the pyrolysis of inhomogeneous waste material and the respective methods have not been generally adopted in practice.

DE-PS No. 27 02 048 teaches a process for the manufacture of Portland cement in which the waste materials are incinerated in a zone external to the rotary kiln to yield a gaseous in combustible product and to a bottom ash product, and incorporating the gaseous product with the exhaust gases of the rotary kiln while in contact with the calcareous material employed in the process; and incorporating at least part of the asher into the clinker. However, a major part of the heat of said gaseous product cannot be used for decarbonating the raw meal because of the relatively low temperature of the gases. This necessarily reduces the efficiency. A substantial saving of conventional fuel cannot be achieved thereby. Since the exhaust gases of the rotary kiln and those of the zone are jointly discharged, it is not possible to control the respective combustion processes independently so that uncontrollable operating conditions with negative effects on the quality of the clinker and emissions result. Depending on the composition of the waste material, dioxines and/or furans may be formed as a result of the relatively low incineration temperatures in the zone and the instability of the process. The described apparatus does not provide for a separate discharge of pollutants. This results in an emission of volatile heavy metals. Moreover, chlorine is circulated in the system and brought in contact with the flue gases of the incineration. In the presence of phenolic compounds in such gases this may lead to the formation of chlorinated dibenzodioxins and dibenzofurans.

Thus, all of the prior art processes either have the disadvantage that, based on the amount of produced clinker, only minor amounts of refuse can be utilized, or, when using larger amounts of refuse, only little heat-economical exploitation of the refuse for the calcining process of the cement manufacture is possible, due to the low incineration temperatures. Moreover, there is the danger of formation of toxic organic compounds.

It is the object of the invention to create a process for the manufacture of cement clinker allowing both an ecologically unobjectionable disposal of large amounts of combustible waste material and the heat-economical exploitation of said material for calcining.

Subject matter of the invention is a process for the disposal of combustible refuse in the manufacture of cement clinker by preheating and partly calcining the cement raw meal in a preheater, burning in a rotary kiln and finally air-cooling the clinker, the refuse being separately burned and the flue gas obtained thereby transfers its heat to the cement raw meal, said process being characterized in that hot exhaust air of the clinker cooling is fed to the refuse incineration and thereby flue gas having a temperature of 1000° to 1400° C. is produced during said incineration by means of which the cement raw meal is calcined; and in that the slag of the refuse incineration is discharged separately. The expression "calcining" means in the context of this invention the decarbonation of calcium carbonate of the cement raw meal to form calcium oxide and carbon dioxide, the latter integrating into the gas phase.

The combustible refuse to be disposed of according to the invention embraces all kinds of refuse (categories I, II and III of the information pamphlet "ABFALLARTEN", published by the Ländergemeinschaft Abfall with the cooperation of the Federal Minister of the Interior of the Federal Republic of Germany), which contain a combustible fraction, in particular municipal waste and similar refuse, special industrial refuses, agricultural refuses, sewage, car shredding refuses as well as special refuses from the medical and pharmaceutical field.

The process of this invention is preferably used for relatively hetereogeneous and high ash content refuses, such as municipal waste, including bulky scrap and industrial refuses of similar nature.

The "preheater" as used within the scope of this invention embraces apparatuses known in the art for preheating and calcining the cement raw meal, such as suspension type preheater, with or without precalcining device, grate preheater or shaft preheater. It has proved to be particularly advantageous to burn the refuse not only in an unit that is separate from the clinker burning apparatus, but to effect the incineration by means of hot exhaust air from the clinker cooler. The supply of hot air from the clinker cooler offers the possibility of incinerating at high temperatures with a relatively minor excess of air whereby a particularly hot flue gas can be obtained from the incinerator. The application of the method of the present invention allows the recovery of the flue gas from the incinerator at temperatures ranging from 1000° to 1400° C., the supply of hot air from the clinker cooler and the control of the incinerator being conducted in such a manner that flue gases having a temperature of preferably 1150° to 1400° C. are produced. When the incineration is conducted at this temperature range, polychlorinated hydrocarbons cannot be formed, even dioxins and/or furanes possibly present in the refuse will be decomposed at these temperatures.

The flue gas temperatures which can be attained in the incinerator depend inter alia on the temperature of the exhaust air of the clinker cooler utilized according to the present invention; temperatures of this cooler exhaust air ranging from 300° to 800° C. have proved to be particularly advantageous.

Since the incineration is carried out with excess of air, the flue gas still contains oxygen at very high temperature which can be utilized for burning additional fuel in the presence of the raw meal being calcined.

The method of the present invention solves the problem posed particularly well when the temperature of the flue gas produced during the incineration is as high as possible as this allows to make use of the heat for an almost complete calcining of the cement raw meal in the preheater.

At all events, care is taken that an as hot flue gas as possible is produced by the incineration. Accordingly, also the necessary air for combustion should have an as high temperature as possible and the incineration takes place with relatively little excess of air. Also a direct or indirect predrying of the refuse, in particular with the exhaust gases of the clinker rotary kiln, contributes to high flue gas temperatures.

To optimize the efficiency of the process of the present invention, both in respect of the amount of refuse to be disposed of as well as its heat-economical utilization for calcining the cement raw meal, the amount of refuse is to be selected such as to allow the formation of sufficient amounts of flue gases from the incineration. In practice, specific refuse amounts of up to 1 kilogram of refuse per 1 kilogram of clinker can be used, this depending on the calorific value of the refuse.

By drawing the flue gases of the incinerator through the preheater, the cement raw meal fed thereinto is calcined and the gas is cooled to about 850° C. The so-cooled gas flows further through the preheater and heats the cement raw meal. When large quantities of refuse are utilized, almost the entire requirement of energy which is necessary for decarbonating the cement raw meal may be supplied by the heat of the flue gases of the incineration. Thus, the requirement of conventional fuel for the cement clinker manufacture is practically reduced to the requirement of sintering the clinker at the discharge end of the rotary cement kiln.

Thus, the invention allows a saving of conventional fuel of up to about 70%, as compared to the prior art clinker burning plants which operate according to the heat economizing dry process.

Quantitative ratios of exhaust gas to cement raw meal prevail in the preheater which are substantially higher than those of conventional clinker burning plants. Therfore, according to the method of the present invention, the preheater must be larger than in the case of conventional clinker burning plants.

The increased quantitative ratio of exhaust gas to cement raw meal and thus an excessive supply of heat of the exhaust gas in respect of the preheating of the cement raw meal, may, according to the method of the invention, be even utilized for other purposes. For example, recuperators may be installed in the apparatus. Hence energy may be generated by building in a pipe system—through which a carrier medium flows to which heat is transferred—in that area of the preheater where temperatures below 800° C. prevail. If it is not desired to utilize this additional heat, water can, for example, be sprayed into that preheater area where the gas temperature is below 800° C. to reduce the volume of this gas and adjust it to the desired low temperature level.

The calcining (decarbonation) of the cement raw meal by the flue gases of the referred to in this disclosure incineration, must not necessarily be completed in the preheater, in particular in the precalciner to avoid a partial sintering. The decarbonation of the raw meal can be completed in the rotary kiln.

The present invention also allows the utilization of non-treated refuse.

In order to achieve an as uniform flue gas as possible, both in respect of its temperature and its carried along solid particles, with waste of varying composition and quantity, an advantegeous embodiment of the invention is to conduct the incineration in a rotary kiln. The latter can cope with the unusually high combustion temperatures of the incineration better than any other combustion furnace.

The incinerator is preferably directly connected to the preheater, in particular to the precalciner, in such a manner that the flue gases from the incinerator come into contact with the preheated cement raw meal before they reach walls and fittings of the preheater. By virtue of this direct transfer of the flue gases, condensation and clogging on the walls of the conduits and other parts of the apparatus are avoided.

Due to the high combustion temperatures in the incinerator, the slag formed thereby is predominantly discharges molten, depending on its chemical composition. This allows to homogenize the slag. By cooling this molten mass in a water bath, a glassy product is formed which, depending on its chemical composition, exhibits more or less latent hydraulic properties.

As a result of the high combustion temperatures in the incinerator, non-combustible potential noxious matters are substantially volatized so that a leaching resistant slag is formed which can be disposed of or utilized without any risk. Therefore, the method of the present invention exhibits the further advantage over conventional incineration methods that a slag is produced containing considerably less noxious matters if at all, and being more homogeneous and having more or less latent hydraulic properties which enable its use as component in the manufacturing of cement by grinding together with cement clinker. Furthermore, it can be otherwise utilized or marketed. Moreover, it is possible to use at least a certain proportion of the slag, depending on its composition, as $SiO_2$ and/or $Al_2O_3$ component in the manufacture of cement raw meal.

An essential effect in conducting the method according to the present invention is that heavy metals and their compounds, sulfur dioxide, chlorides, fluorides etc. which are volatized in the incinerator during combustion are carried along with the flue gases and are being absorbed by the cement raw meal.

Thus, part of these substances are incorporated in the cement clinker and are rendered harmless thereby. Another part is revolatized in the cement clinker kiln and is carried along with the exhaust gases of that kiln. At least part of these exhaust gases should be cooled and dedusted. The substances volatized in the clinker kiln are thereby condensed, absorbed by the kiln dust and separated in the precipitator. Part of this dust, preferably a separated coarse grained fraction which according to experience exhibits a low content of noxious matters, may be refed together with the cement raw meal, however, part thereof must be removed from the system. A residual portion of the exhaust gases if any may be conveyed into the preheater.

By virtue of selecting that proportion of the exhaust gases of the clinker kiln which is cooled and conveyed to the precipitator, and that proportion of the dust which is removed from the system, the amount of dust produced and the potential noxious matter concentration of said dust may be controlled within certain limits. Thus, as compared to conventional incineration, the method of the present invention has the advantage of a low emission of potential noxious matters without necessitating any flue gas scrubbing. Moreover, a dust is obtained with a high concentration of the noxious components. The quantity of dust to be disposed of is accordingly small.

Chlorine brought into the system is removed with the dust. Thus, it can be made sure that the flue gases of the incineration which may contain phenolic compounds due to incomplete combustion of lignin components cannot come into contact with chlorine or its compounds at temperatures below 400° C. Therefore, the formation of chlorinated dibenzodioxins and dibenzofurans is not possible.

Apart from the above-mentioned considerable saving of conventional fuel in the manufacture of clinker, the method offered by the invention has the further advantage that since the exhaust air from the clinker cooler is used for the incineration its expensive dedusting as required according to the prior art can be dispensed with, or at least the precipitator can be designed to be smaller.

A further embodiment of the invention teaches to discharge part of the preheater gas or material streams after the preheater, based on the direction of gas flow, and to convey the same into the clinker kiln. In this way, noxious matter-containing compounds which already volatize at temperatures below 800° C. may be conveyed to the clinker rotary kiln and be cooled and dedusted together with the exhaust gases of this kiln. The so-condensed noxious components which are absorbed by the dust can be discharged therewith. In order to achieve this, it is also possible to join together a partial stream of the preheater flue gases with the clinker rotary kiln exhaust gases and to jointly cool and dedust the same.

A further embodiment of the invention teaches to substitute the air supply for the combustion in the clinker rotary kiln at least partly by a supply of pure oxygen or by a supply of air which is enriched by oxygen. The amount of exhaust gases in the clinker kiln is reduced thereby. The velocity of the gas in the kiln decreases such that less dust is carried along and, accordingly less dust has to be disposed of. The heat loss of the clinker kiln is reduced as less exhaust gas is drawn out of it. Less secondary air will be necessary for the combustion in the clinker rotary kiln so that one can make use of further and hotter clinker cooler exhaust air for the incineration and, accordingly, for calcining the raw meal.

Finally, one embodiment of the invention teaches to promote the incineration by supplying oxygen to it. The incineration can then be conducted by even higher temperatures and its heat can be better exploited for calcining the raw meal, as compared to a combustion with air only. Furthermore, the supply of oxygen results in a reduction of the specific amount of flue gas of the incineration or, at a given flue gas flow rate, in an increase of the amount of refuse to be disposed of in the system.

Depending on the available waste material, its amount, and the quality and quantity of the fed raw meal, the method of the present invention offers further possibilities of optimization by specific guidance and branching of the various gas streams. For example, the exhaust gases from the clinker rotary kiln, or part thereof, may be utilized for predrying the waste material. By predrying the waste, a still higher combustion temperature can be achieved in the incineration process. Exhaust gases of the clinker kiln may likewise be utilized for calcining and preheating the cement raw meal in a second preheater. Proportions of these gases can also be conveyed to the preheater through which the flue gases of the incineration are passed. Excess exhaust gases from the clinker rotary kiln can, for example, be also utilized for drying the raw materials for the cement manufacture, for indirect heating of the combustion air, for producing heat in a central heating plant, or for electric power generation. Preheater flue gases which are available in large quantities may analogously be used for heat-economical purposes.

Further advantageous features of the invention are disclosed in the further patent claims and specification documents.

Specific embodiments of the process of this invention are illustrated by the enclosed flow diagram.

The drawing shows a rotary kiln for burning clinker (1), a cyclone suspension preheater (2) comprising four cyclones (2b1, 2b2, 2b3, 2b4) and a precalciner (2a), a clinker cooler (4) and a rotary kiln for the incineration (5) having a feeding device for the waste (8) and an auxiliary burner (18).

The clinker kiln (1) is operated with conventional fuels which are fed via burner (6). In (3), cement raw meal is fed to the preheater through the gas conduit which connects the two uppermost cyclones (2b1) and (2b2). The precalciner (2a) is directly connected to the incinerator (5) so that the flue gas from the incinerator (5) is in direct contact with the preheated raw meal originating from cyclone (2b3). A contraction (15) of the cross section of the precalciner takes care for the hot raw meal to be completely carried along with the gas stream. In order to counterbalance variations in the thermal capacity of the incinerator flue gases, a direct fuel supply (7) to the precalciner may be provided for. The precalciner (2a) opens out at its lower portion, to make it atmosphere-tight, into a water bath (16) into which the slag from the incinerator falls and is discharged from there by means of a drag chain (17).

Part of the hot exhaust air from the clinker cooler (4) is passed via a conduit (9) as combustion air into the incinerator (5). Another part can be directly conveyed, via conduit (10) into the precalciner (2a).

The cement raw meal which is substantially decarbonated in the precalciner (2a) is deposited in cyclone (2b4) and is fed from there, via conduit (14) into the clinker kiln (1).

At least part of the clinker kiln exhaust gases is discharged via conduit (11) and is cooled in an apparatus (not shown) and dedusted. Another part of the clinker kiln exhaust gases may be fed, via conduit (12), into the precalciner (2a) and/or discharged to be utilized for other purposes (13). A water injection, not shown, may take place in the cyclones, or in the gas conduits of the cyclon preheater (2) which connect the same.

We claim:

1. In the disposal of combustible refuse and the manufacture of cement clinker from cement raw meal by a process comprising the steps of
   (a) preheating and calcining the cement raw material in a preheater,
   (b) feeding the preheated calcined cement raw material produced in (a) into a cement rotary kiln,
   (c) burning the calcined raw material in the rotary kiln to form clinker, and subsequently air cooling said clinker in a clinker cooler, thereby producing hot exhaust air, and
   (d) incinerating the combustible refuse in an incinerator generating flue gas and slag, and transferring heat from the flue gas to the cement raw material, the improvement which comprises
   (i) feeding hot exhaust air from (c) to the incinerator in (d),
   (ii) conducting the incineration in (d) to produce flue gas of 1000°–1400° C. and feeding it to (a), and
   (iii) separating the slag produced in (d).

2. A process according to claim 1, wherein the flue gas produced in (d) has a temperature of from 1150° to 1400° C.

3. A process according to claim 1, wherein the exhaust air from the clinker cooling in (c), withdrawn for the refuse incineration, has a temperature of from 300° to 800° C.

4. A process according to claim 1, wherein the refuse incineration in (d) takes place in a rotary kiln.

5. A process according to claim 1, wherein the refuse is incinerated in (d) without previous processing.

6. A process according to claim 1, wherein the exhaust gas produced in the cement clinker rotary kiln in (c) is at least partly cooled and dedusted and at least part of the dust is removed from the system.

7. A process according to claim 6, wherein part of the exhaust gas produced in the cement clinker rotary kiln in (c) is utilized for drying cement raw meal or additives for cement manufacture, or for calcining cement raw meal.

8. A process according to claim 1, wherein the slag from the refuse incineration in (d) is discharged as molten flow into a water bath.

9. A process according to claim 1, wherein the slag produced in the refuse incineration in (d) is ground together with Portland cement clinker and gypsum for the manufacture of cement.

10. A process according to claim 1, wherein part of the exhaust gas produced in the cement clinker rotary kiln in (c) is used for predrying the refuse.

11. A process according to claim 1, wherein part of the exhaust gas produced in the cement clinker rotary kiln in (c) is utilized for indirectly heating up air of combustion for the refuse incineration in (d).

12. A process according to claim 1, wherein part of the gas stream through the preheater or leaving the preheater or part of the material streams passing the preheater or being collected at the exhaust gas dust collector following the preheater in direction of the gas flow in (a) is branched off and conveyed to the cement clinker rotary kiln in (c).

13. A process according to claim 1, wherein part of the flue gas leaving the preheater in (a) is joined with exhaust gas of the cement clinker rotary kiln in (c) and is jointly cooled and dedusted together therewith.

14. A process according to claim 1, wherein the burning in the cement clinker rotary kiln in (c) is conducted by supplying oxygen or oxygen enriched air to said kiln.

15. A process according to claim 1, wherein the incineration of the refuse in (d) is conducted by supplying oxygen or oxygen enriched air to the incinerator.

16. A process according to claim 1, wherein heat at a temperature below 800° C. is indirectly drawn from the gas previously used for calcining in (a).

17. A process according to claim 1, wherein water is sprayed into the gas used for calcining in (a) which is at a temperature between 400° C. and 800° C.

* * * * *

UNITED STATES PATENT AND TRADEMARK OFFICE
CERTIFICATE OF CORRECTION

PATENT NO. : 4,678,514
DATED : July 7, 1987
INVENTOR(S) : Henning Deyhle, et al.

It is certified that error appears in the above-identified patent and that said Letters Patent is hereby corrected as shown below:

Title Page, No. "[75] Inventors", line 2 — Correct spelling of --Alexander--

Title Page, No. "[73] Assignee:" — Delete "Dyckerhoff Engineering GmbH, Wiesbaden, Fed. Rep. of Germany" and substitute:
-- Grisar, Alexander German Nationality --.

Col. 1, line 9 — Correct spelling of --transferred--

Col. 1, line 15 — After "used" delete "of" and substitute --for the--;
After "processing" insert --of--

Col. 1, line 16 — Delete "the" and substitute --of--

Col. 1, line 17 — After "dump" delete "of"

Col. 3, line 33 — Before "unit" delete "an" and substitute --a--

Col. 4, line 64 — Correct spelling of --advantageous--

Col. 7, line 47 — Correct spelling of --cyclone--

Col. 8, line 41 — After "stream" insert --passing--

Col. 8, line 42 — After "passing" insert --through--

Signed and Sealed this

Tenth Day of May, 1988

*Attest:*

DONALD J. QUIGG

*Attesting Officer*    *Commissioner of Patents and Trademarks*